(12) United States Patent
Dowling

(10) Patent No.: US 6,363,475 B1
(45) Date of Patent: Mar. 26, 2002

(54) APPARATUS AND METHOD FOR PROGRAM LEVEL PARALLELISM IN A VLIW PROCESSOR

(75) Inventor: Eric M. Dowling, Richardson, TX (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/653,641

(22) Filed: Aug. 31, 2000

Related U.S. Application Data

(62) Division of application No. 08/996,526, filed on Dec. 23, 1997, now Pat. No. 6,170,051.
(60) Provisional application No. 60/054,471, filed on Aug. 1, 1997.

(51) Int. Cl.[7] .................................................. G06F 9/38
(52) U.S. Cl. ........................ 712/206; 712/24; 712/207; 710/27
(58) Field of Search ................................ 712/205, 206, 712/207, 24; 710/22, 27

(56) References Cited

U.S. PATENT DOCUMENTS

| 5,333,280 A | 7/1994 | Ishikawa et al. |
| 5,404,469 A | 4/1995 | Chung et al. |
| 5,442,760 A | 8/1995 | Rustad et al. |
| 5,450,556 A | 9/1995 | Slavenburg et al. |
| 5,450,557 A | 9/1995 | Kopp et al. |
| 5,530,817 A | 6/1996 | Masubuchi |
| 5,574,939 A | 11/1996 | Keckler et al. |
| 5,600,810 A | 2/1997 | Ohkami |
| 5,625,835 A | 4/1997 | Ebcioglu et al. |
| 5,634,025 A | 5/1997 | Breternitz, Jr. |
| 5,655,133 A | 8/1997 | Dupree et al. |
| 5,845,307 A | 12/1998 | Prabhu et al. |
| 5,867,725 A | 2/1999 | Fung et al. |
| 6,061,710 A | 5/2000 | Eickemeyer et al. |
| 6,073,159 A | 6/2000 | Emer et al. |
| 6,170,051 B1 | 1/2001 | Dowling |

OTHER PUBLICATIONS

*A VLIW Architecture for a Trace Scheduling Compiler*, Robert P. Colwell, et al., published Jan., 1987 by Multiflow Computer.

Multi–Threaded Vectorization, Tzi–cker Chieuh, Sep. 1997, Department of Electrical Engineering and Computer Science University of California Berkeley, California.

A Variable Instruction Stream Extension to the VLIW Architecture, Andrew Wolfe, et al., Sep. 1997, Department of Electrical and Computer Engineering Carnegie Mellon University, Pittsburgh, Pennsylvania, pp. 2–14.

(List continued on next page.)

Primary Examiner—William M. Treat
(74) Attorney, Agent, or Firm—Gazdzinski & Associates

(57) ABSTRACT

A very long instruction word (VLIW) processor exploits program level parallelism as well as instruction level parallelism. Unlike prior VLIW machines which obtain speed advantages using instruction level parallelism, the present processor exploits the parallelism inherent in a VLIW processor by providing new instruction level mechanisms to separate processor execution into parallel threads. This separation allows greater hardware use because more than one program can exploit instruction level parallelism on the system at the same time. A first program and a second program execute concurrently such that the second program executes using resources and cycles that would have been wasted by the first program. This construct is especially useful where the second program is an interrupt service routine because the interrupt service routine can be threaded through the machine with high or low priority while the functional units still process the first program stream. A superscalar version of the processor is also described.

25 Claims, 8 Drawing Sheets

OTHER PUBLICATIONS

HARP: A Multiple Instruction Processor Chip Incorporating RISC and VLIW Design Features, S.A. Trainis, et al., Microelectronics Journal, 23(1992) pp. 115–119.

An Elementary Processor Architecture with Simultaneous Instruction Issuing from Multiple Threads, Hiroaki Hirata, et al., 1992, Computer Architecture News, vol. 20, No. 4, May 1992, pp. 136–145.

Exploiting Instruction–Level Parallelism: The Multithreaded Approach, Philip Lenir, et al., Dec. 1992, SIG MICRO NEWSLETTER, vol. 23, No. 1 & 2, pp. 189–192.

MISC: A Multiple Instruction Stream Computer, Gary Tyson, et al., Dec. 1992, SIG MICRO NEWSLETTER, vol. 23, No. 1 & 2, pp. 193–196.

URPR–1: A single–chip VLIW architecture, Bogong Su, et al., 1993, Microprocessing and Microprogramming 39, pp. 25–40.

V++: An Instruction–Restructurable Processor Architecture, Takaya Arita, et al., 1994, IEEE Computer Society Press, pp. 398–407.

Multithreaded Processor for Image Generation, Takayuki Sagishima, et al., 1994, IEEE Computer Society, vol. 4 of 6, pp. 231–234.

Non Homogenous Parallel Memory Operations in a VLIW Machine, R. Milikowski, et al., 1994, Parallel Processing: CONPAR 94—VAPP VI, pp. 485–496.

Architecture Design and Analysis of a VLIW Processor, Arthur Abnous, et al., 1995, Computers Electrical Engineering vol. 21, No. 2, pp. 119–142.

Minimal Pipeline Architecture–an Alternative to Superscalar Architecture, Martti J. Forsell, 1996, Microprocessors and Microsystems 20, pp. 277–284.

Daisy: Dynamic Compilation for 100% Architectural Compatibility, 1997, Computer Architecture, pp. 26–37.

Exploiting Instruction and Data–Level Parallelism, Espasa, Roger, et al., (Sep./Oct. 1997), IEEE Micro, pp. 20–27.

Simultaneous Multithreading: A Platform for Next–Generation Processors, Eggers, Susan J., et al., (Sep./Oct. 1997), IEEE Micro, pp. 12–19.

APPARATUS AND METHOD FOR PROGRAM LEVEL PARALLELISM IN A VLIW PROCESSOR

REFERENCE TO RELATED APPLICATION

The present application claims priority benefit of provisional application No. 60/054,471, filed Aug. 1, 1997, and is a divisional of U.S. patent application Ser. No. 08/996,526 filed Dec. 23, 1997 entitled "Apparatus And Method For Program Level Parallelism In A VLIW Processor", now U.S. Pat. No. 6,170,051.

BACKGROUND OF THE INVENTION

1. Field of the Invention

The present invention relates to the field of microprocessor architecture. More specifically, the present invention relates to high performance processors such as digital signal processors that use very long instruction words (VLIW) or employ superscalar architectures.

2. Description of the Related Art

Two types of parallelism are commonly employed in microprocessor systems. In program level parallelism, more than one program is executed at the same time, normally on multiple processors. This form of parallelism is common, for example, in servers employing four to eight processors, all of which are connected to a single bus. Instruction level parallelism is another form of parallelism, in which a single instruction stream is executed on a single processor, but the instructions are dispatched to multiple functional units in the same cycle. This latter type of parallelism is used by Very Long Instruction Word (VLIW) and superscalar processors.

Program level parallelism includes task oriented parallelism and multithreading. In the simplest form of program level parallelism, different tasks are executed on different processors, so that the server handles more users, but no one user's program can finish faster than it would if it had executed on a single processor system. In multithreading, a single program forks execution onto more than one processor, so that the program runs faster than it would on just one processor. Both forms of program level parallelism increase the net amount of useful work done in a given time interval. Task oriented parallelism allows the processor to perform parallel processing even when the individual programs are not specifically developed for parallel execution. Unfortunately, current VLIW machines are not well suited to any of these forms of program level parallelism.

VLIW architectures are rapidly gaining popularity and acceptance. The concept of VLIW is to fetch a very long instruction word, and to dispatch subinstructions contained in this very long word to a set of parallel functional units. For example, the very long instruction word might contain 256 bits, so that eight functional units each concurrently receive one 32-bit sub-instruction. In prior art systems, if all the sub-instruction words are not needed, the dispatcher can take multiple cycles to dispatch the instructions of the 256-bit instruction word to the functional units. One difference between VLIW machines and superscalar machines is that in VLIW machines the compiler schedules the instructions for parallel execution, so that the dispatch unit of a VLIW machine is very simple. In superscalar machines, the dispatch unit handles the parallel instruction scheduling using hardware algorithms, so that the dispatch unit of a superscalar machine is usually more complex.

One significant problem with VLIW machines is that, while they are capable of very high peak instruction per second counts, their performances may be much lower when executing actual programs. For example, consider the execution of a hypothetical VLIW processor having sixteen functional units. If the functional units are grouped into four sets of four cooperating functional units, with each group of functional units having primary access to a specific register file, then the system has four processing groups or has four sub-processors. These sub-processors all receive their instructions from the same instruction stream and follow the same control flow. That is, a branch taken in the program affects all four of the sub-processors in the system In many processing situations, the separate sub-processors may need to take different branches. However, there is only one instruction stream, so the various sub-processors executing various data sets must all execute in lock-step. One way this is handled is to make extensive use of conditionally executed instructions. Using conditional execution, there can be a single execution flow and only the sub-processors that need to execute instructions in a particular path do so, whereas the sub-processors that do not need to execute instructions sit idle. For example, assume four data streams are being processed in parallel on this hypothetical VLIW machine, and further assume that the code involves an IF-THEN-ELSE construct. At the machine level, a condition must be checked, and then a branch must be taken to either the THEN or the ELSE portions of the code. Since there are four data paths, it is very likely that among the four sub-processors, both the THEN and the ELSE program paths must be traversed. In the prior art, the processor executes both paths using conditionally executed instructions. In this way, each sub-processor performs useful operations on one path while effectively inserting "no operation" (NOP) instructions on the other. Since NOPs represent wasted cycles, performance is adversely affected.

Other problems arise when the various sub-processors work together on the same data. For example, if two data streams are to be processed on the same processor and the data involves complex numbers each having a real and an imaginary part, it would be advantageous for two processing groups to work together to deal with the real and imaginary parts of the complex data and to quickly compute the cross terms. This type of processing is quite common in communication systems processing and whenever a Fast Fourier Transform (FFT) is involved. In a hypothetical processor of sixteen functional units, eight functional units are available for each of two complex data streams. If all of the units are busy all the time, the peak number of instructions per cycle is achieved. In practice, however, it is very difficult to keep all functional units busy, and thus much lower efficiencies are achieved.

There are still other problems that create delays and inefficiencies. For example, if a branch is taken, multiple cycles need to be inserted while the pipelines empty and the new instruction flow makes its way through the pipeline. Other delays occur since the compiler must structure the code to avoid pipeline conflicts due to resource and data dependencies. These issues limit the amount of instruction-level parallelism that can be exploited in a program. That is, the local instruction level structure of the program very rarely allows a full set of instructions to be mapped onto the complete set of functional units in a given cycle.

Another problem with current VLIW architectures is the need to respond to interrupts. When interrupts occur, they can cause new programs to be fetched that will overwrite program words stored in the on-board cache, while creating their own sequence of cache misses. Cache misses are very expensive in VLIW machines. In the hypothetical processor having 16 functional units, the cache line fill involves sixteen slower external memory accesses per instruction, instead of a single on-chip cache-hit fetch cycle.

In short, while VLIW processors can theoretically achieve very high peak processing speeds, it is very difficult in practice to achieve these peak speeds on actual programs. This difficulty is compounded by inefficient branching, by conditionally executed instructions, and by difficulties arising from the need to perform multitasking and to respond efficiently to interrupts.

SUMMARY OF THE INVENTION

One aspect of the present invention is an enhanced VLIW architecture capable of alleviating the aforementioned shortcomings in the prior art. Another aspect of the present invention is a VLIW processor capable of executing multiple programs concurrently, allowing one program to execute in a cycle steal mode to make use of inefficiencies in another program. Yet another aspect of the present invention is a system to allow interrupts that can be processed with minimal cost in terms of clock cycles. The present invention further allows programs to fork execution down a plurality of branch paths in an efficient manner so that few cycles are wasted. The present invention provides a functional unit, a control unit, a dispatch unit, and cache structures. The present invention also provides methods that greatly increase the actual throughput that can be achieved on a VLIW architecture to thereby provide an actual performance that is much closer to peak performance than in current systems.

One aspect of the present invention is a multi-issue processor having a plurality of functional units responsive to processor instructions. The functional units have access to a primary register file. The processor comprises one or more auxiliary register files configured such that each of the functional units has access to a primary register file and to an auxiliary register file. The functional units are responsive to a register file selection signal. A dispatch unit is configured to accept instructions from a plurality of instruction streams and to generate the register file selection signal on an instruction-by-instruction basis to control whether each of the functional units uses the primary register file or the auxiliary register file. Preferably, the functional units further comprise one or more primary internal registers, one or more auxiliary internal registers, and an execution controller configured to accept a control signal from the dispatch unit. The execution controller is configured to control whether specified functional units use the primary register file or the second register file on a cycle-by-cycle basis. Also preferably, at least one of the instruction streams may come from a direct memory access controlled prefetch channel which is processed in the background in a cycle-steal mode. Also preferably, at least one of the instruction streams is activated in response to an interrupt. Also preferably, the instruction streams may be assigned different execution priorities under program control. The processor preferably also comprises a register renaming unit operative to rename registers and to accept inputs from and to retire results to either the primary register file or the auxiliary register file to support superscalar instruction dispatching and execution from a plurality of program sources. Preferably, the dispatch unit dispatches a plurality of instructions to a plurality of functional units in a single clock cycle. The dispatch unit selectively dispatches a first group of instructions from a first instruction stream to a first subset of functional units, and the dispatch unit selectively dispatches a second group of instructions from a second instruction stream to a second subset of functional units. The first and second instruction streams preferably comprise VLIW fetch packets, wherein each VLIW fetch packet comprises one or more execute packets, and wherein each execute packet comprises one or more instructions to be dispatched to one or more functional units in a single clock cycle.

Another aspect of the present invention is a processor having multiple functional units. Each functional unit has a plurality of pipeline stages. Each pipeline stage has access to a primary register file. The processor comprises one or more secondary register files, so that each of the functional units has access to a selection of register files. The selection of register files comprises a primary register file and a secondary register file. The functional units are responsive to a register selection signal to select a primary register file or a secondary register file. A plurality of pipelined register sets are included in each of the functional units. A dispatch unit accepts instructions from a plurality of instruction streams and sends instructions from the multiple instruction streams to the functional units. The dispatch unit asserts the register selection signal to select a register file from a set of register files. The set of register files comprises the primary register file and the secondary register file. The dispatch unit further generates a pipeline command for each of the functional units. The pipeline command selects one or more of the pipelined register sets in each of the functional units. A pipeline command delay line propagates the pipeline command so that, during each clock cycle, each stage of each functional unit is associated with a selected one of the instruction streams. Preferably, the plurality of instruction streams includes a first instruction stream and a second instruction stream, wherein the first and second instruction streams each comprises VLIW fetch packets. Each VLIW fetch packet comprises one or more execute packets, and each said execute packet comprises one or more instructions to be dispatched to one or more functional units in a single clock cycle. Preferably, in a given cycle, the dispatch unit is operative to dispatch all instructions from the next execute packet found in said the instruction stream and to dispatch one or more instructions from the current or next execute packet found in the second instruction stream, such that one execute packet is dispatched per cycle in the first instruction stream and such that execute packets in the second instruction stream are dispatched on a cycle-steal basis. In some cases, the execute packets in the second instruction stream are dispatched in multiple cycles.

Another aspect of the present invention is a processor which has multiple functional units. Each functional unit has one or more pipeline stages, and each pipeline stage has access to a primary register file. The processor comprises one or more secondary register files. Each of the functional units has access to a selection of register files comprising a primary register file and a secondary register file. Each functional unit is responsive to a register selection signal to select a primary register file or a secondary register file. The processor further includes one or more pipelined register sets in each of the functional units. A dispatch unit accepts instructions from a plurality of instruction streams and sends instructions from the plurality of instruction streams to the functional units. The dispatch unit asserts the register selection signal to select a register file from a set of register files. The set of register files comprises the primary register file and the secondary register file. A pipeline command delay line propagates the register selection signal so that, during each clock cycle, each stage of each functional unit is associated with a selected one of the instruction streams. Preferably, the plurality of instruction streams includes a first instruction stream and a second instruction stream, wherein the first and second instruction streams each comprise VLIW fetch packets. Each VLIW fetch packet comprises one or more execute packets, and each execute packet comprises one or more instructions to be dispatched to one or more functional units in a single clock cycle. Also preferably, in a given cycle, the dispatch unit is operative to dispatch all instructions from the next execute packet found in the first instruction stream, and to dispatch one or more instructions from the current or next execute packet found in the second instruction stream, such that one execute packet is dispatched per cycle in the first instruction stream and such that execute packets in the second instruction stream are dispatched on a cycle-steal basis. Also preferably, execute packets in the second instruction stream are dispatched in multiple cycles.

Another aspect of the present invention is a method for multithreading a VLIW processor or a computer system incorporating a VLIW processor. The method comprises the step of prefetching into a plurality of prefetch buffers a plurality of VLIW fetch packets from a plurality of instruction streams including a first instruction stream and a second instruction stream. Each VLIW fetch packet comprises one or more execute packets, and each execute packet comprises one or more instructions to be dispatched to one or more functional units in a single clock cycle. The method includes the further steps of dispatching all instructions contained in the next execute packet found in the first instruction stream, such that one execute packet is dispatched per cycle in first instruction stream; and dispatching one or more instructions from the most recent execute packet found in the second instruction stream, such that the most recent execute packet is dispatched on a cycle-steal basis. Preferably, the most recent execute packet is dispatched in multiple cycles. In preferred embodiments, the method further comprises the step of dispatching with each instruction a pipeline command for each of the functional units, whereby the pipeline command selects a first register set to be coupled to the functional unit if the instruction is from the first instruction stream. The pipeline command selects a second register set to be coupled to the functional unit if the instruction is from the second instruction stream. The pipeline command is dispatched via a pipeline command delay line so that, during each clock cycle, each functional unit is associated with a selected one of the instruction streams.

Another aspect of the present invention is a method of multithreading in a superscalar processor or a computer system incorporating a superscalar processor. The method comprises the step of prefetching into a plurality of prefetch buffers a plurality of instruction fetch packets from a plurality of instruction streams. A first prefetch buffer is associated with a first instruction stream and a second prefetch buffer is associated with a second instruction stream. The method includes the step of determining which instructions in the first prefetch buffer are ready to dispatch in parallel in a given cycle. The method dispatches all instructions determined to be ready to dispatch from the first prefetch buffer for which hardware resources are available. The method determines which instructions in the second prefetch buffer are ready to dispatch in parallel in said given cycle. The method dispatches one or more instructions from the second prefetch buffer using the hardware resources not already in use by the instructions in the first prefetch buffer. Preferably, the method comprises the further step of dispatching with each instruction a pipeline command for each of the hardware resources, whereby the pipeline command selects a first register set to be coupled to a first hardware resource when the instruction is from the first instruction stream, and the pipeline command selects a second register set to be coupled to the first hardware resource when the instruction is from the second instruction stream. Preferably, the pipeline command is propagated by a pipeline command delay line so that, during each clock cycle, each hardware resource is associated with a selected one of the instruction streams.

Another aspect of the present invention is a method of multithreading in a superscalar processor or a computer system incorporating a superscalar processor. The method comprises the steps of: prefetching into a plurality of prefetch buffers a plurality of instruction fetch packets from a plurality of instruction streams including a first prefetch buffer associated with a first instruction stream and a second prefetch buffer associated with a second instruction stream; determining which instructions in the first and second prefetch buffers are ready to dispatch in parallel in a given cycle; and dispatching instructions determined to be ready to dispatch from the first and second prefetch buffers for which hardware resources are available based on a scheduling algorithm. Preferably, the scheduling algorithm is a round robin scheduling algorithm.

Another aspect of the present invention is a multi-issue processor having multiple functional units. Each functional unit has one or more pipeline stages with each pipeline stage having access to a primary resource. The processor comprises one or more secondary resources provided as a selection of resources accessible by selected functional units. A thread indicator signal designates from which instruction stream an instruction was dispatched,. The selected functional units are responsive to the thread indicator signal. A dispatch unit concurrently accepts multiple instructions from each of a plurality of instruction streams. In a given cycle, the dispatch unit selectively sends instructions from multiple instruction streams to the functional units. The dispatch unit asserts the thread indicator signal to select a set or resources to be accessed by the functional units responsive to the thread indicator signal while carrying out said instruction. A thread indicator delay line propagates the thread indicator signal so that, during each clock cycle, different stages of the functional units are responsive to the thread indicator signal to selectively use the selected set of resources.

Another aspect of the present invention is a method of operating an instruction cache in a processor where the instruction cache has a plurality of cache lines and a plurality of cache banks. The method comprises the steps of inserting data into each cache bank according to a cache bank selector field indicator; and using the cache bank selector field while filling each of the cache lines to ensure that instructions on parallel branch paths reside in different cache banks.

Another aspect of the present invention is a processor which has one or more functional units. Each of the functional units has access to a primary register file and is responsive to instructions emanating from a plurality of instruction streams. The processor comprises an instruction cache memory which is divided into one or more cache banks. A plurality of program counters and a plurality of prefetch registers are included in the processor. Each of the prefetch registers is configured to store a plurality of sub-instructions for the functional units. A multiple input dispatch unit is configured to accept input instructions from a plurality of instruction streams with ranked priority levels and to dispatch the input instructions to the functional units. The multiple input dispatch unit further provides each functional unit a code indicative of the instruction stream from which each input instruction was accepted, such that the functional units can process each instruction using a register set associated with the instruction stream.

Another aspect of the present invention is a method for executing a conditional branch construct on a VLIW processor with multiple sub-processors, where each sub-processor comprises a group of data registers and functional units. The method comprises the step of factoring the conditional branch construct into a plurality of execution paths such that an execution flow on the processor is disjoined into a plurality of execution paths. The method generates a sequence of VLIW instruction words for each path such that all of the sequences are aligned. Each of the sequences is padded with NOPs to maintain alignment if necessary. The method further includes the steps of maintaining a respective instruction pointer for each execution path; checking multiple conditions based on multiple data streams for each of the sub-processors; allocating each of the sequences to a sub-processor; fetching a single VLIW from two or more separate addresses in a cache concurrently using a mask field; and executing the sequences of VLIW instruction words. Preferably, the conditional branch construct is an IF-THEN-ELSE construct. Alternatively, the conditional branch construct is a CASE construct.

Another aspect of the present invention is a method for parallel execution of a plurality of execution paths on a VLIW processor with multiple sub-processors, where each sub-processor comprises a group of data registers and functional units. The method comprises the step of generating a sequence of VLIW instruction words for each execution path such that all of the sequences are aligned. Each of the sequences is padded with NOPs to maintain alignment if necessary. The method includes the further steps of maintaining a respective instruction pointer for each execution path; checking multiple conditions based on multiple data streams for each of the sub-processors; allocating each of the sequences to a sub-processor; fetching a single VLIW from two separate addresses in a cache concurrently using a mask field; and executing the sequences of VLIW instruction words.

Another aspect of the present invention is a method for parallel execution of a plurality of execution paths on a VLIW processor with multiple sub-processors, where each sub-processor comprises a group of data registers and functional units. The method comprises the step of generating a sequence of VLIW instruction words for each execution path such that all of the sequences are aligned. Each of the sequences is padded with NOPs to maintain alignment if necessary. The method includes the further steps of maintaining a respective instruction pointer for each execution path; checking multiple conditions based on multiple data streams for each of the sub-processors; allocating each of the sequences to a sub-processor; fetching a single VLIW from two separate addresses in a cache concurrently using a mask field; and executing the sequences of VLIW instruction words.

Another aspect of the present invention is a processor having one or more functional units responsive to processor instructions. The functional units have access to a primary register file. The processor comprises one or more auxiliary register files configured such that each of the functional units has access to a primary register file and to an auxiliary register file; and a register file selector for each of the functional units. The register file selector accepts instructions from a plurality of instruction streams and selects a register file for each of the functional units on an instruction-by-instruction basis. Preferably, the functional units further comprise a plurality of pipelines; and a pipeline selector which selects a pipeline for each functional unit. The pipeline is selected from the plurality of pipelines on a cycle-by-cycle basis.

Another aspect of the present invention is a processor which comprises one or more functional units; a program cache which provides a primary execution stream of instructions to a first prefetch buffer for use by the one or more functional units; a second prefetch buffer which provides a secondary execution stream of instructions to the one or more functional units in response to an interrupt applied to the one or more functional units; and a DMA controller which fetches the secondary stream of instructions and stores the secondary stream of instructions in the prefetch second buffer. Preferably, the primary instruction stream comprises VLIW instructions, and the program cache is a VLIW program cache. Also preferably, the second instruction stream is accessed in response to an interrupt.

Another aspect of the present invention is a pipelined processor which multiplexes the processing of a first instruction stream and a second instruction stream on a cycle-by-cycle basis, wherein the first instruction stream and the second instruction stream are both fetched into respective prefetch buffers from a single program cache. Instructions from the second instruction stream are fetched from the program cache during intervals when a pipeline operation related to the processing of the first instruction stream would normally stall the fetching of instructions from the program cache. Preferably, the instructions are VLIW instructions, and the program cache is a VLIW program cache.

Another aspect of the present invention is a method for operating a pipelined processor which multiplexes the processing of a first instruction stream and a second instruction stream on a cycle-by-cycle basis. The method comprises the steps of fetching instructions for a first instruction stream from a program cache into a first prefetch buffer; and fetching instructions for a second instruction stream from memory into a second prefetch buffer under control of a direct memory access controller.

Another aspect of the present invention is a very long instruction word (VLIW) processor which exploits program level parallelism as well as instruction level parallelism. Unlike prior VLIW machines which obtain speed advantages using instruction level parallelism, the present processor exploits the parallelism inherent in a VLIW processor by providing new instruction level mechanisms to separate processor execution into parallel threads. This separation allows greater hardware use because more than one program can exploit instruction level parallelism on the system at the same time. A first program and a second program execute concurrently such that the second program executes using resources and cycles that would have been wasted by the first program. This construct is especially useful where the second program is an interrupt service routine because the interrupt service routine can be threaded through the machine with high or low priority while the functional units still process the first program stream. A superscalar version of the processor is also described.

BRIEF DESCRIPTION OF THE DRAWINGS

A system which embodies the various features of the invention is described below with reference to the following drawings.

DETAILED DESCRIPTION OF THE PREFERRED EMBODIMENT

Figure 1:
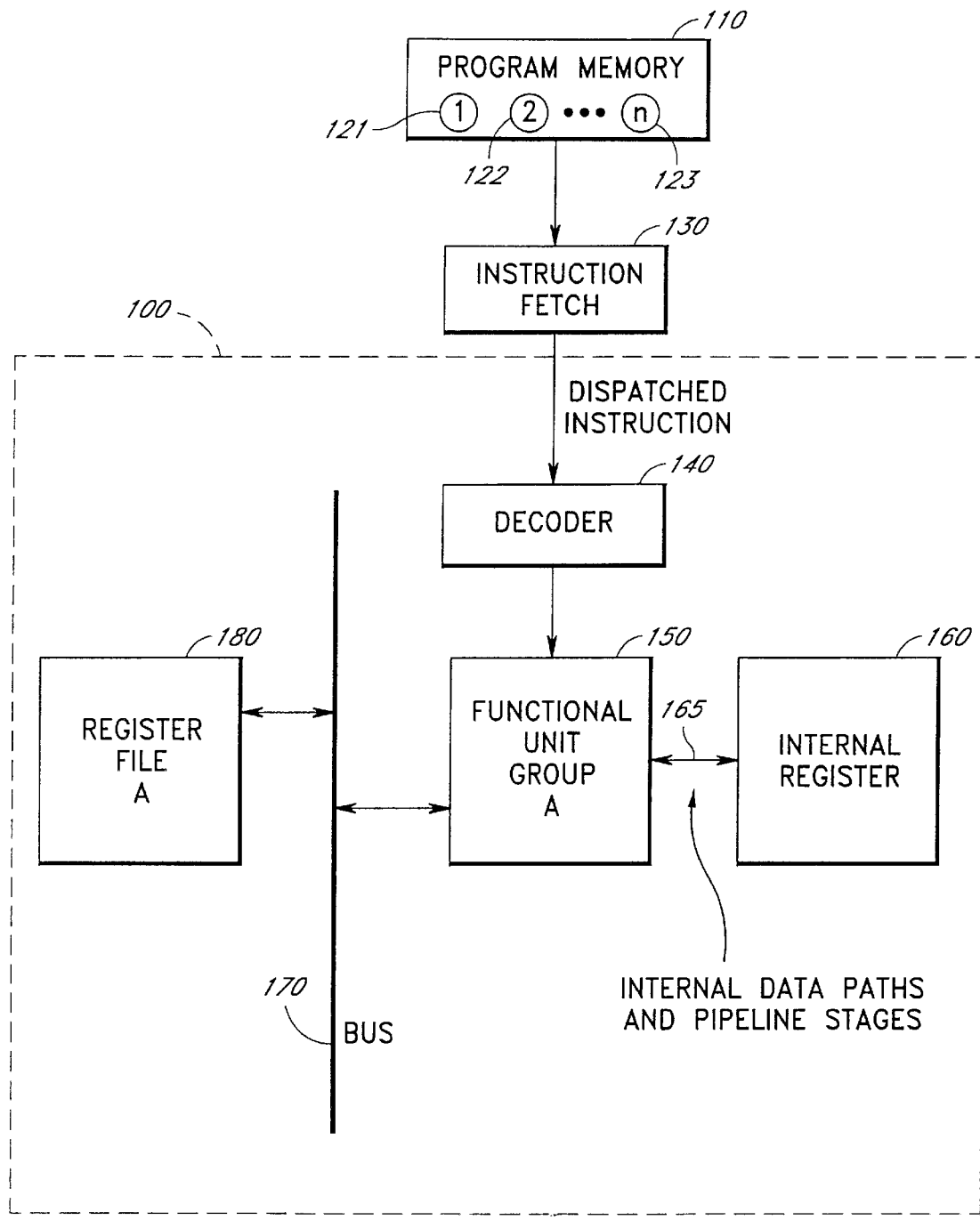
FIG. 1 is a block diagram of a prior art functional unit as found in VLIW or superscalar machines.

FIG. 1 illustrates a prior art sub-processor 100 as found in VLIW or superscalar machines. A program memory 110 is coupled to the sub-processor 100. The program memory 110 contains one or more programs—typically a first program 121, a second program 122, and possibly additional programs 123. The program memory may be implemented as a VLIW program cache. An instruction fetch unit 130 accesses one or more of the programs in the program memory 110 and sends instructions to a decoder 140. The decoder 140 sends decoded instructions to an "A" functional unit group 150 that includes one or more internal registers 160, coupled via one or more internal data paths 165. The functional unit group 150 contains computational hardware (such as a load/store unit, an arithmetic logic unit, and a multiplier) and communicates with a bussing structure 170 that is in communication with a register file 180. If the functional unit group 150 includes a multiplier having a plurality of internal registers 160, the multiplier can be concurrently working on successive phases of several different multiply operations from a sequence of instructions. The dispatch and instruction issuance logic may be complex as a result of these internal registers 160 to ensure that different instructions being executed in sequence in the pipeline do not interfere with each other. The dispatch unit may be simplified by demanding that the programmer or compiler ensure that only valid instruction sequences which do not create conflicts are encountered in the instruction stream.

Figure 2:
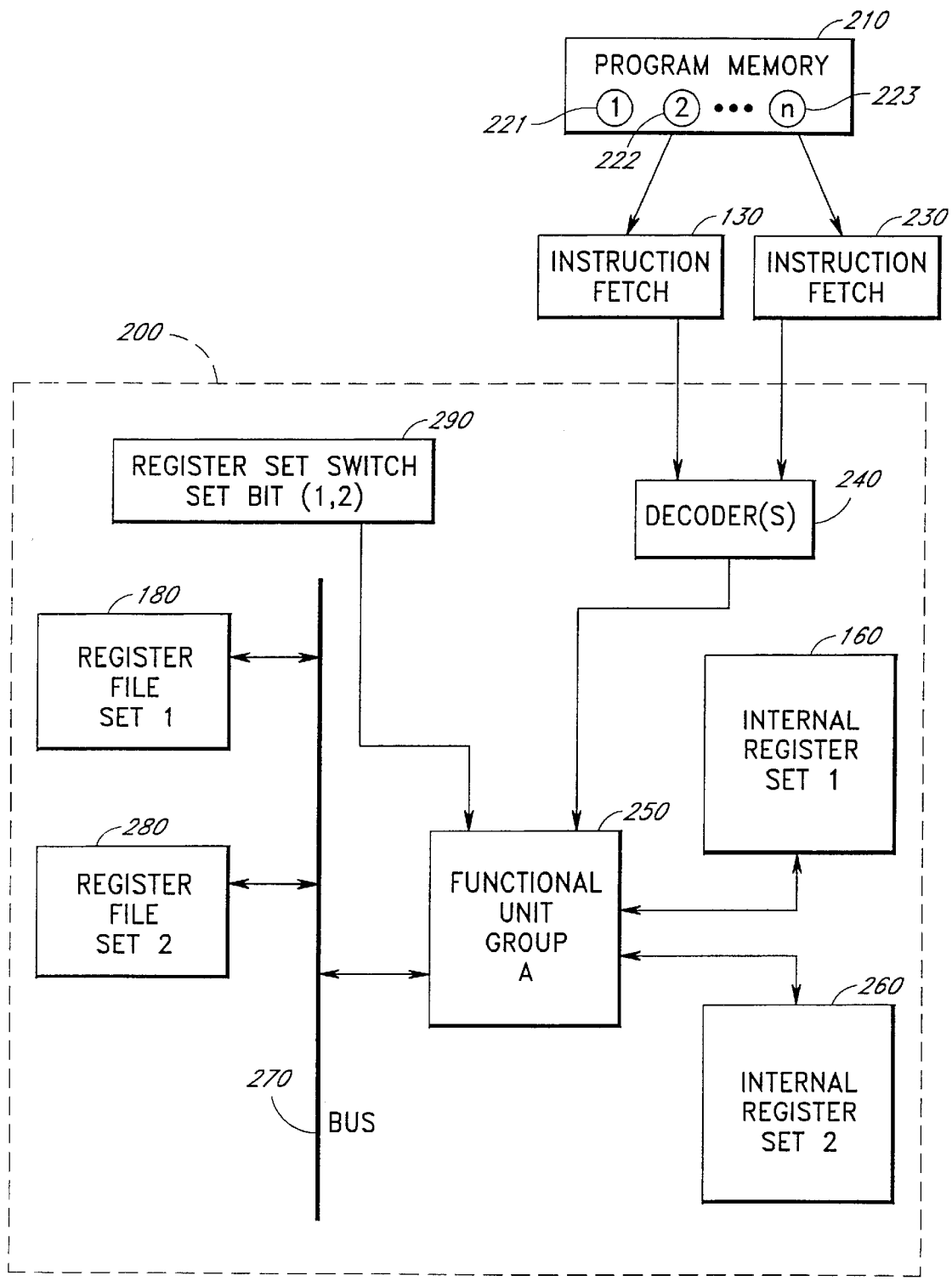
FIG. 2 is a block diagram of a processor functional unit that provides for improved execution of program level parallelism through the use of additional sets of instruction fetches, internal registers and register files, as well as through the use of a register set switch which may function as an external interrupt.

FIG. 2 illustrates one embodiment of the present invention-namely, a sub-processor 200 that is similar to the sub-processor 100 and further comprises additional internal registers 260 and register files 280, as well as a register set switch 290 that may function under control of an external interrupt. The sub-processor 200 is additionally coupled to sets of instruction fetch units 230 which are in turn coupled to a program memory 210 which preferably stores a plurality of programs (e.g., a program 221, a program 222, and a program 223). The sub-processor 200 also includes a group of decoders 240, an "A" functional unit group 250, and a bus 270, all of which perform functions similar to their counterparts in FIG. 1. By adding second sets of internal registers 260 and a register file 280, the processing hardware of the functional unit group 250 can quickly switch both internal context and external context. That is, if instructions from the first program 221 are being processed through the sub-processor 200, the register set switch 290 is all that is needed to process instructions from the second program 222 through the same sub-processor. Using the secondary internal register set 260 permits more than one instruction stream to be multiplexed on an instruction-by-instruction basis through the sub-processor 200. As a result, the dead time of the sub-processor 200, due to program dependencies, branches, and other issues, is largely reduced, since two instruction sources can be simultaneously serviced. Whenever the sub-processor 200 is not busy with the first program 221, it can switch to the second program. Switching to and from the second program can occur on a cycle-by-cycle basis, as described below.

Figure 3:
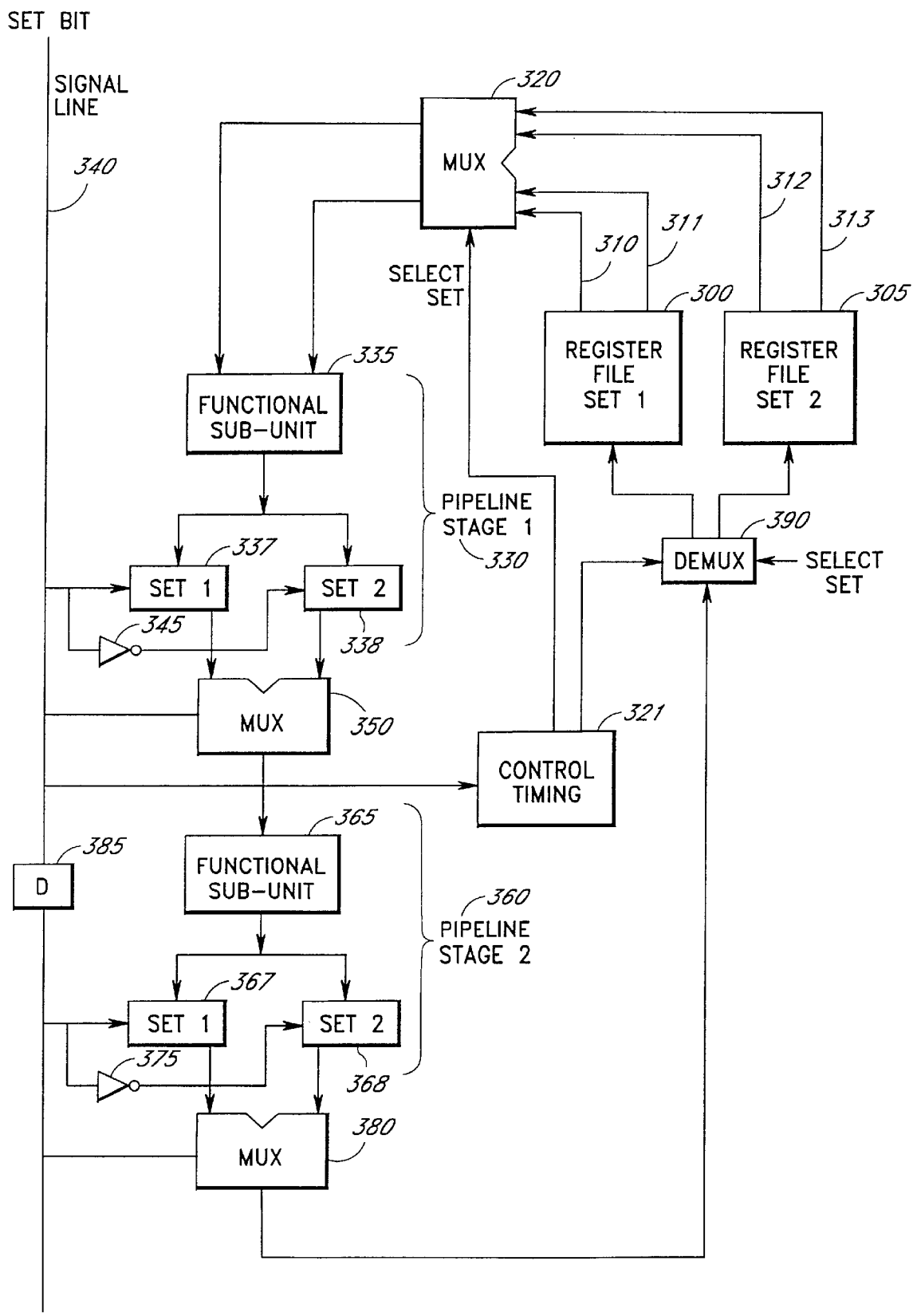
FIG. 3 illustrates additional details of a processor comprising pipelined functional units that use dual internal and external register sets.

FIG. 3 illustrates one embodiment of the present invention comprising pipelined functional units that use dual internal and external register sets. A functional unit comprising two pipeline stages is presented to illustrate the inventive concept. A first register file 300 is preferably connected by data paths 310 and 311 to a multiplexer 320. A second register file 305 is preferably connected by data paths 312 and 313 to the multiplexer 320. A control input (SELECT SET) of the multiplexer 320 is provided by a control timing block 321 to allow the multiplexer 320 to select operands (OPS) from either of the two register files 300 and 305. The output of the multiplexer 320 feeds a first pipeline stage 330 which comprises a functional sub-unit 335 (e.g., first stage logic in a load-store or multiply unit) which preferably couples to internal data registers 337 and 338. A single-bit signal line 340 coupled to an input of an inverter 345 determines which of the internal registers 337 or 338 is selected to be loaded with data. The outputs from the internal registers 337 and 338 are provided as respective inputs of a multiplexer 350. When the signal on the signal line 340 is active, the register 337 is enabled to store data, and when the signal on the line 340 is inactive and the output of the inverter 345 is active, the register 338 is enabled to store data. The signal line 340 also controls which input of the multiplexer 350 is selected to be gated to the output of the multiplexer 350. The signal line 340 is also provided to an input of the control timing block 321.

The output from the multiplexer 350 is fed into a second pipeline stage 360 which comprises a functional sub-unit 365 having internal registers 367 and 368 and an inverter 375. Outputs from the registers 367 and 368 are provided as inputs to a multiplexer 380. The second pipeline stage 360 is also connected to the signal line 340, except that a delay element 385 delays the signal, preferably by one clock cycle, to permit proper synchronization of the data as it passes through the second pipeline stage 360. The delay element 385 allows the different stages of the instruction pipe to process instructions from multiple sources concurrently. The output from the multiplexer 380 is fed into a demultiplexer 390. The demultiplexer 390 is controlled by the control timing block 321 so that values can be selectively stored in the register file 300 or the register file 305. By adding the circuitry shown in FIG. 3, two (or more) data paths for multiple programs are possible. This hardware configuration supports processing modes that greatly increase system performance.

In operation, the pipelined functional unit of FIG. 3 may receive one instruction per clock cycle. Initially instructions are dispatched to the functional unit from a first instruction stream. While processing the first instruction stream, the functional unit accesses data in the register file 300 (set one)

while the signal line 340 controls routing of results through the set one internal register data path 337, 367. In the course of normal VLIW program execution, inevitable inefficiencies related to data and control dependencies will prohibit the dispatch unit from dispatching instructions to all the functional units during a clock cycle. These inefficiencies will occur in at least some of the functional units during most clock cycles as the VLIW program executes. When these inefficiencies arise, instead of allowing the functional unit to stall, an instruction may be dispatched to the functional unit from a second instruction stream. During a cycle when an instruction from the second instruction stream is dispatched, the signal line 340 is deasserted to select the set two register file 305 and the set two internal register paths 338, 368. Note that the delay element 385 allows the first pipeline stage 330 to process data from the second instruction stream, while the second stage 360 of the pipeline processes data from the first instruction stream. Thus, with the present invention, the functional unit is switched between tasks or threads on a cycle-by-cycle basis. During a clock cycle, different functional units in the system can be dispatched instructions from multiple instruction streams, and the individual pipelines within individual functional units may process instructions from multiple instruction streams. Other embodiments provide more than two register sets and multiplexer paths to enable more than two instruction streams to be concurrently processed.

Figure 4:
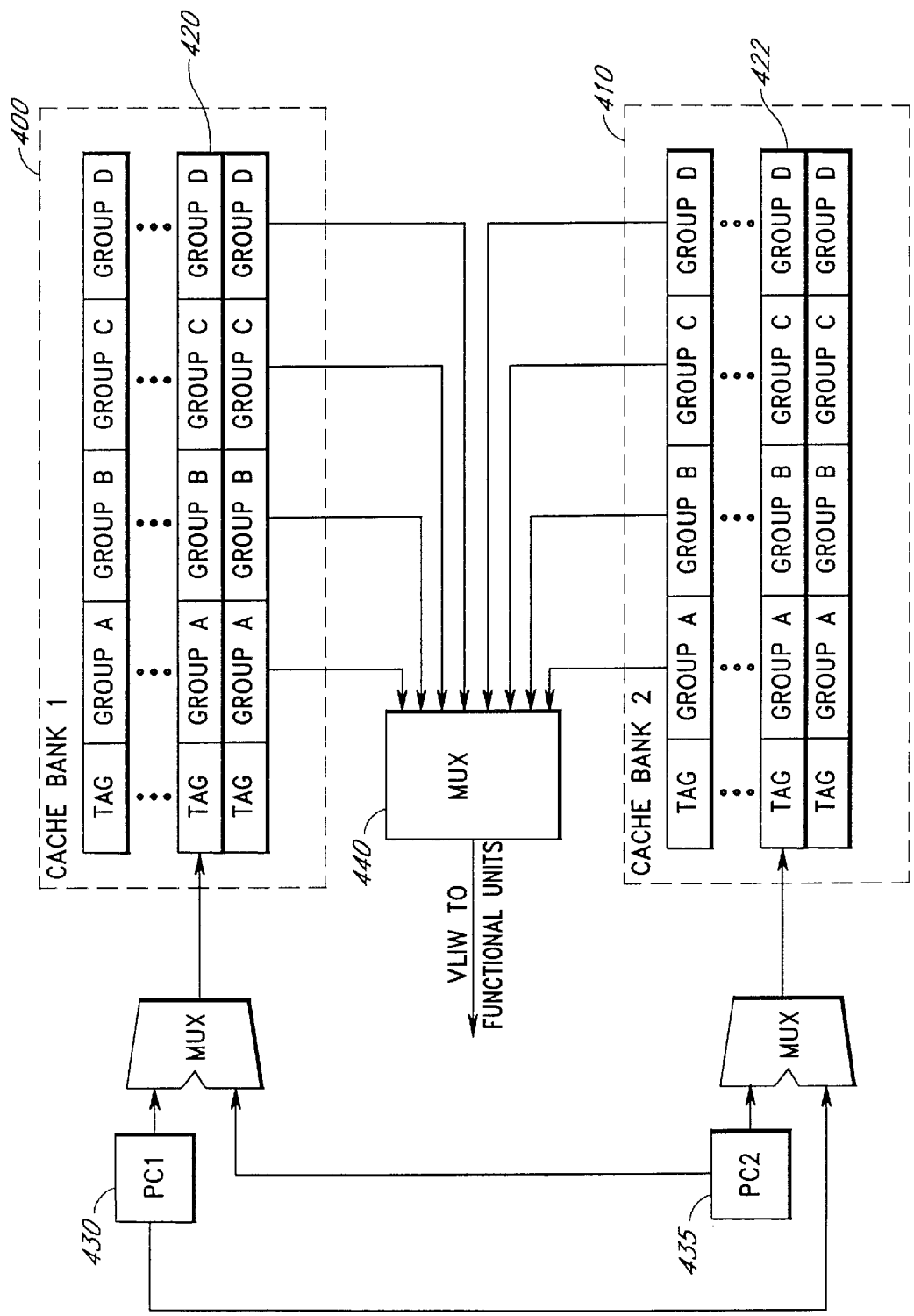
FIG. 4 is a block diagram of a VLIW caching structure that supports parallel branching.

FIG. 4 illustrates yet another embodiment of the invention comprising a VLIW caching structure that supports parallel branching. The cache is shown to be segmented into two cache-banks 400 and 410, in which the cache banks include a plurality of cache lines 420 and 422. The cache lines 420, 422 may in turn comprise various instructions fields, represented by the letters A, B, C, and D, for functional groups which may include, for example, load/store units, arithmetic logic units, shifters, and multipliers. Address multiplexers (not shown) allow two program counters (PC1 430) and (PC2 435) to assert addresses to the cache tag content addressed memory (CAM) concurrently. If the instructions are found in the separate cache banks 400 and 410, then a single VLIW can be fetched from multiple cache lines, for example, from a line 420 in the first bank 400 and another line 422 in the second bank 410, by coding parallel branch instructions such that the instructions for the different functional units will be properly aligned in the instruction. That is, a no operation (NOP) instruction must be inserted where needed within the VLIW to assure alignment, i.e., to assure that commands for various functional units may be found in predetermined locations within the VLIW.

A cache bank selector field indicator may be generated by the compiler to control the caching of VLIWs into separate cache lines located in the separate banks when parallel branching is needed. The cache bank selector field can be implemented using an extra bit field in the VLIW, or the field may be encoded into the VLIW using other means.

The split VLIW cache structure of FIG. 4 provides a means to fork multiple execution threads within a single VLIW instruction stream. Such a capability is usefull for example, when an IF-THEN-ELSE control structure is encountered in a program executing on a VLIW architecture where multiple sub-processors process multiple instruction streams in parallel. For example, a VLIW processor may have sixteen functional units arranged into four groups of functional units, where at least one register file is associated with each group of functional units. This exemplary VLIW processor is said to have four sub-processors. Since the VLIW architecture only provides one execution thread, all four sub-processors will execute instructions and branch in lock-step with all the other sub-processors. In some programs, the four sub-processors will operate on four separate data sets while executing substantially the same instruction sequences. In this type of processing, all four sub-processors may be used to execute an IF-THEN-ELSE statement. In such a case, the sub-processors will need to branch to either the THEN-code or the ELSE-code depending on the data values in the four individual data paths. Some of the sub-processors can be used to execute the THEN-code while others are used to execute the ELSE-code. The prior art solution is to have all the sub-processors execute both the THEN-code and the ELSE-code conditionally. That is, all processors execute all of the code, while effectively inserting NOPs when no processing is required. While this design is simple from a control standpoint, it forces the program to execute a sequence of instructions equal to the total number of instructions in both the THEN-code and the ELSE-code. The cache structure of the present invention avoids this inefficiency.

The program counters 430 and 435 control two parallel instruction streams. One program counter addresses instructions in the THEN branch, and the other program counter addresses instructions in the ELSE branch. A multiplexer 440 selects the components of each instruction stream that make up the VLIW instruction, i.e., the multiplexer determines which instruction stream each sub-processor, e.g., A, B, C, or D, will execute. If one parallel branch is longer than another, the shorter path will sit in a NOP loop until the longer path completes execution. Once the longer of the two paths completes execution, re-synchronization is attained and the single execution thread continues with one program counter 430 or 435 addressing the entire cache (i.e., the cache banks 400 and 410 together) as a whole. With this embodiment, the IF-THEN-ELSE code executes in the number of cycles required for the longer of the THEN-code or the ELSE-code—not the sum of the two. The cache structure of FIG. 4, in general, allows one or more threads to conditionally branch away from the main VLIW execution thread.

Figure 5:
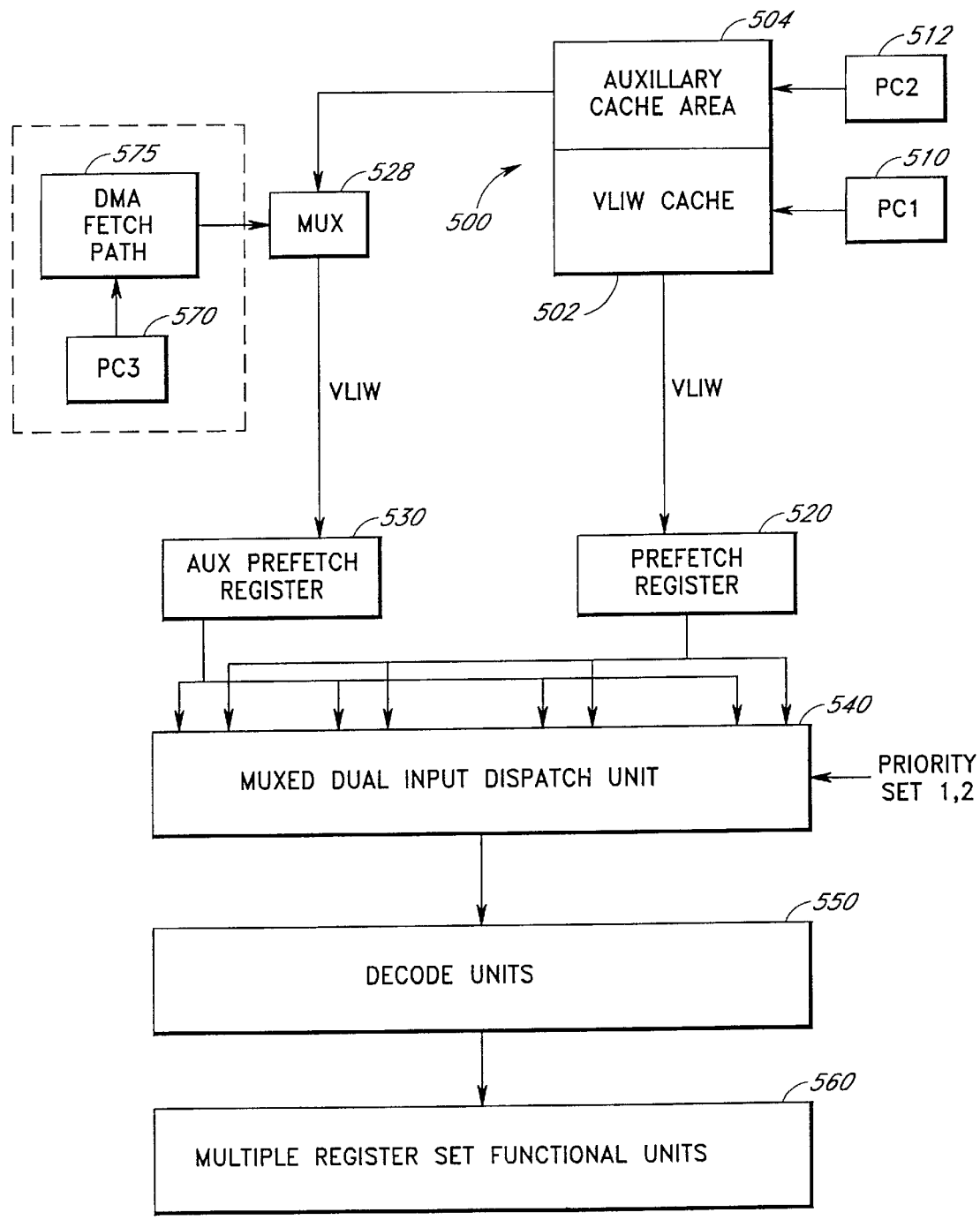
FIG. 5 is a block diagram of a processor architecture having multiple prefetch registers where the parallel execution paths may be completely decoupled.

FIG. 5 illustrates a processor architecture using multiple prefetch registers to provide parallel execution paths where the parallel execution paths may be completely decoupled to allow separate programs to execute concurrently. Separate execution is especially useful for executing multiple individual VLIW (or superscalar) programs. Separate execution also enables very efficient operation of interrupts since interrupt service routines (ISRs) are essentially separate programs that may be executed concurrently. In FIG. 5, a cache 500 is preferably divided into two cache area—a VLIW cache area 502 and an auxiliary cache area 504. The percentage of the available cache allocated to the two respective areas may be fixed or may be set by a processor configuration register. The cache 500 may also be furter divided into more than two areas as well. The cache areas 502 and 504 have respective program counters 510 and 512. An output from the cache area 502 is fed into a prefetch register 520. The output from the auxiliary cache area 504 is fed into an optional multiplexer 528 which in turn provides an output to an auxiliary prefetch register 530. The registers 520 and 530 are provided to a multiplexed dual input dispatch unit 540, to decode units 550, and to multiple register set functional units 560. The multiple register set functional units 560 are designed similarly to the pipelined functional unit illustrated in FIG. 3. An alternative embodiment is indicated in FIG. 5 by the dashed lines surrounding a program counter 570 that feeds into a Direct Memory Access (DMA) fetch path 575. An output of the fetch path 575 is provided to the multiplexer 528. The program counter 570 and the fetch path 575 take the place of the program counter 512 during a DMA-controlled fetch operation.

The dispatch unit 540 services multiple sources so that if one program does not need a resource, the second program can use it. A priority scheme gives priority to a primary execution path, so that program execution time is assured in this path. The second program executes in the background in a cycle-steal processing mode. In the cycle-steal mode, the second program unit steals unused processor cycles from the primary execution path. Since the processor maintains a separate cache, a separate register set and separate internal pipeline registers for the second instruction path, the allocation of unused cycles to the second path does not otherwise interfere with the cache, register set, or pipeline of the primary path. Thus, in terms of clock cycles, the second program can execute virtually for "free."

To assure the correct execution of the second instruction path, an ordering should be maintained. For example, a VLIW may be defined as a fetch packet that contains multiple instructions. As will be discussed subsequently, a subset of instructions that dispatch to one or more functional units in the same cycle is called an execute packet. Hence, to maintain program correctness, one approach is to only dispatch an execute packet from the secondary instruction stream when all the functional units needed by a given execute packet are available. Another approach is to dispatch all instructions which can be dispatched each cycle within an execute packet based on functional availability until the complete execute packet has been dispatched. Once the entire execute packet has been dispatched, the next execute packet may begin to dispatch in a subsequent cycle in a similar manner. In a superscalar system, register renaming and out of order execution algorithms may be applied individually to the primary and secondary instruction streams The priority of the execution paths may be changed under program control. For example, an interrupt service routine (ISR) with a strong real-time requirement can be switched into the high priority mode to meet its real-time deadline. By using the cache area structure of FIG. 5, the VLIWs of the interrupt service routine remain in the auxiliary cache 504. In many cases, the main program will suffer only a minor performance hit while the interrupt service routine executes. Once the interrupt service routine finishes, priority is switched back to the main program. If the interrupt does not have a stringent real-time constraint, the interrupt service routine can execute in the low priority cycle-steal mode without affecting the speed of the main program. Such a low priority interrupt may be termed a polite interrupt, since the main program only gives up resources it is not using to the interrupt service routine.

In the alternative embodiment of FIG. 5, comprising the DMA fetch path 575, a lower priority interrupt or a second auxiliary program may execute without contending for space in the cache 500. A prefetch unit (not shown) inside the DMA fetch path 575 works with a DMA controller to fetch instructions into the auxiliary prefetch register 530. Once the auxiliary prefetch register 530 has filled, data in the prefetch register 530 are routed through the pipeline in a cycle steal mode. In this case, a fast program executes in the foreground and has access to the entire cache 500. A slower, lower priority program executes in the background and fetches instructions from memory only when the primary program does not require the memory bandwidth. Again, the second program executes concurrently for "free." In machines such as DSPs with large on-chip memory, this second program can execute fairly rapidly.

The structure of FIG. 5 can also be applied when the auxiliary cache area 504 has zero entries. This is accomplished by using the two program counters 510, 512 to access the same VLIW cache 502. Normally when a program inefficiency occurs, multiple groups of instructions called execute packets will be dispatched from a single fetch packet. A fetch packet is a complete VLIW containing, for example, eight 32-bit instructions. An execute packet is a set of instructions that dispatch concurrently from the same fetch packet The fetch packet may contain, for example, four execute packets, each execute packet having two instructions. These execute packets will thus require four consecutive cycles to dispatch. Since only one fetch packet is fetched in this four-cycle period, the fetch portion of the pipeline will stall. Thus, several cycles is become available for the second program counter 512 to fetch a VLIV from the same VLfW cache 502 and to route this VLIW to the auxiliary prefetch register 520. In this case, a multiplexer is used to pass the output from the VLIW cache 502 to either the prefetch register 520 or the auxiliary prefetch register 530.

The concepts relating to FIG. 3 and FIG. 5 are also intended for use in superscalar processors as well as VLIW processors. In a superscalar implementation, the same concepts are applied, but a superscalar dispatch unit is used with two or more prefetch buffers to service two or more of instruction streams. The pipelined functional unit in a superscalar implementation has essentially the same structure as discussed with respect to FIG. 3. Two strategies can be adopted to deal with the renaming register pool. The first strategy is to have two distinct register pools associated with each instruction stream to implement register renaming. The second strategy is to have one pool of registers, and to assign the registers to the primary register set or to the secondary register set on an as needed basis. This is a more efficient use of the register pool but requires slightly more complicated control. In the superscalar implementation, when the dispatch unit cannot dispatch an instruction to a particular pipeline due to inefficiencies in the program structure of the first instruction stream, extended dispatch hardware is allowed the opportunity to dispatch an instruction from another instruction stream into the pipeline by switching the data paths using the techniques described in FIG. 3 and FIG. 5.

Figure 6:
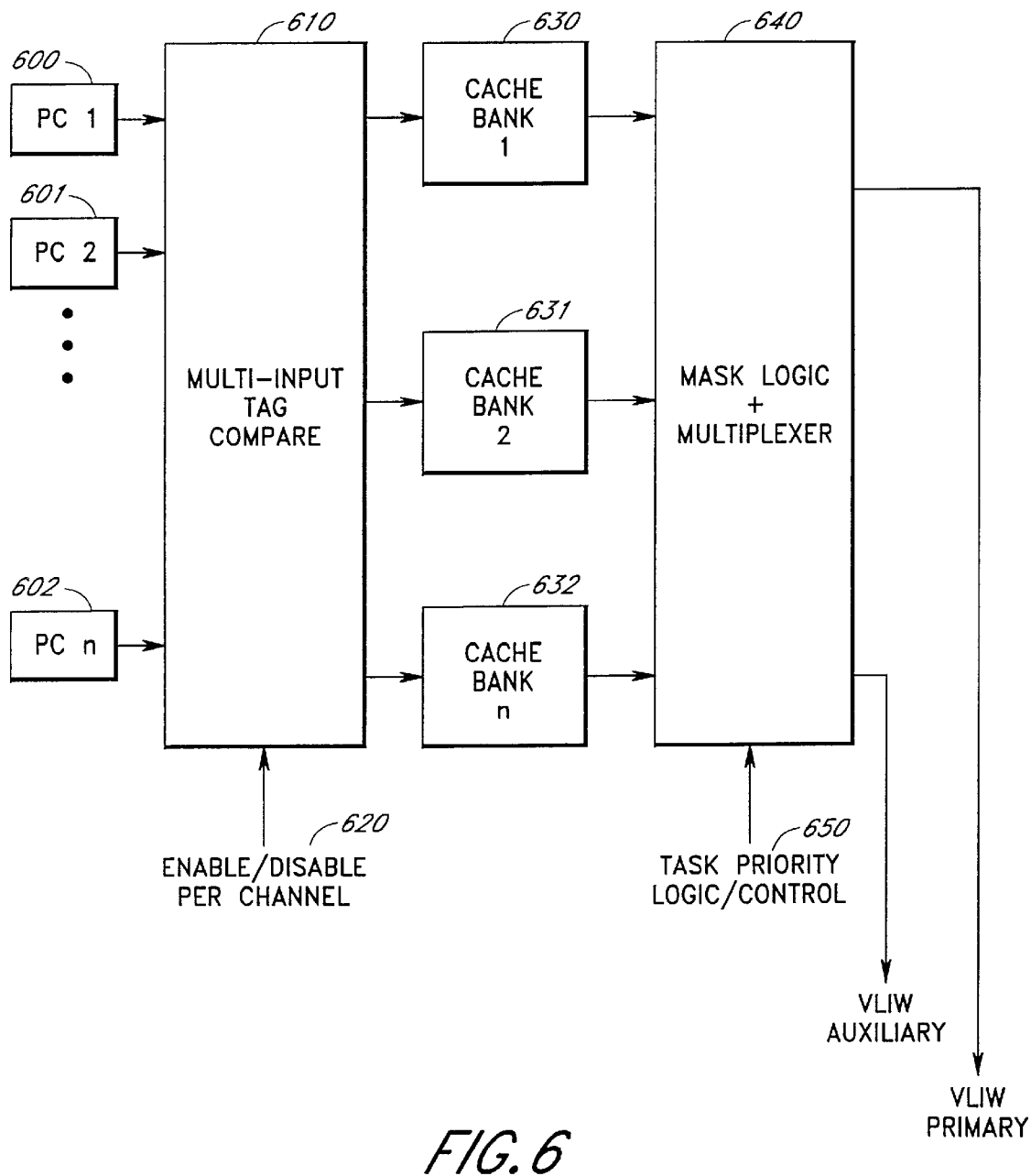
FIG. 6 illustrates an arrangement of a VLIW processor cache which allows multiple programs and interrupt sources to share the processor in order to maximize utilization and efficiency of the functional units.

FIG. 6 shows how a cache can more generally be arranged to allow multiple programs and interrupt sources to share a processor in order to improve utilization and efficiency of the functional units. A plurality of program counters 600, 601, 602 act as inputs for a multi-input tag compare 610 for which there is a set 620 of enable/disable control inputs per channel. An output from the multi-input tag compare 610 feeds into a plurality of cache banks 630, 631, 632 which in turn feed into an optional mask logic and multiplexer 640 activated by task priority logic/control control inputs 650. Outputs from the mask logic and multiplexer 640 comprise both a VLIW auxiliary output and a VLIW primary output The cache organization of FIG. 6 allows multiple threads to execute concurrently out of the same cache. These threads may also be completely independent. A cache bank selector field in the instruction word gives preference to instructions from certain threads to certain cache banks 630, 631, 632. All cache banks 630, 631, 632, however, are available to all instruction streams, keeping the effective size of the cache the same for programs needing the entire cache. The optional mask logic 640 also supports the type of branching described with respect to FIG. 4 where separate execution paths mix to form a single VLIW. As discussed with respect to FIG. 5, in some embodiments a single cache bank may be also be employed wherein VLIWs from the auxiliary path or paths are read during cycles where the primary prefetch path stalls due to multiple execute packets being dispatched from a single VLIW fetch packet.

Figure 7:
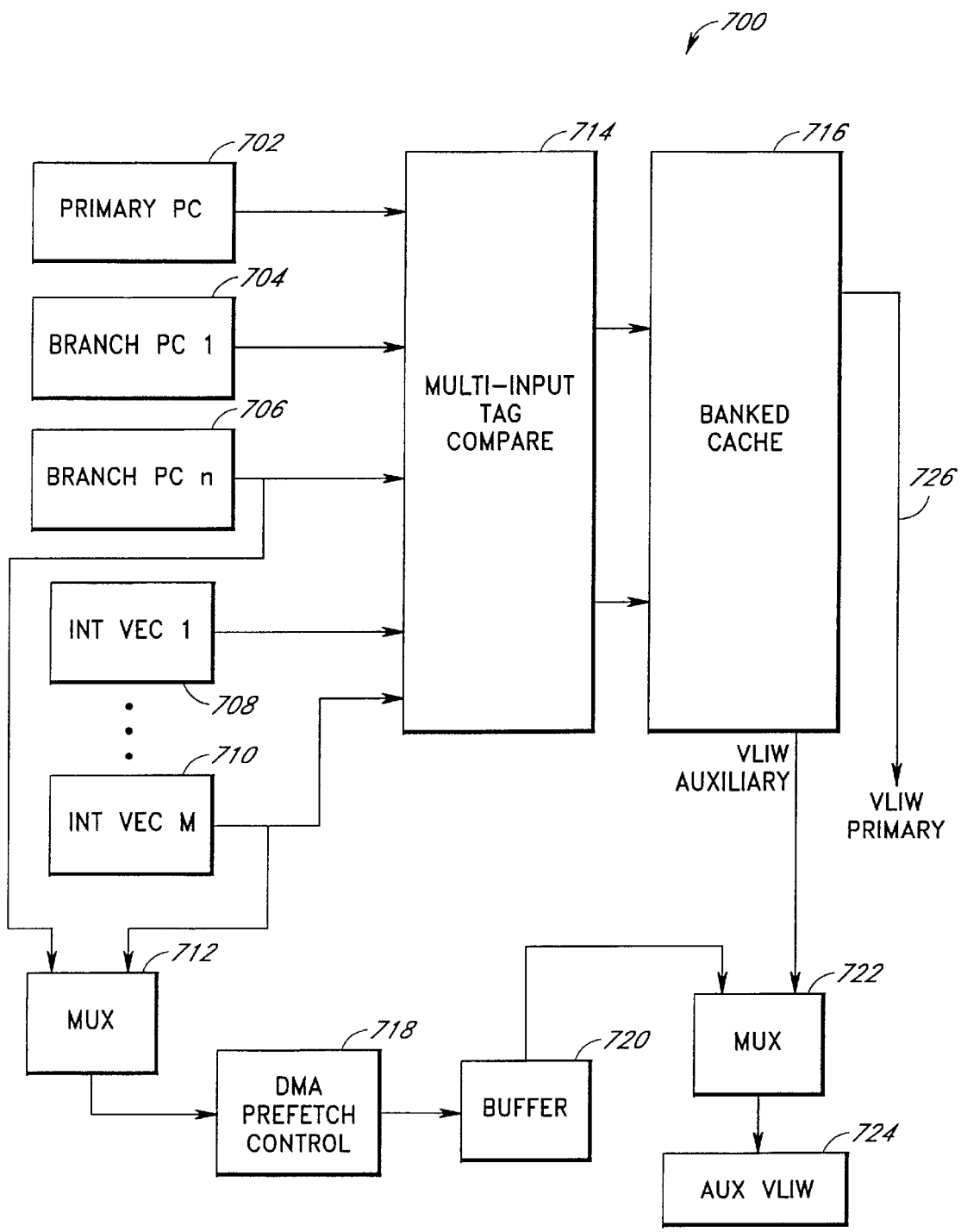
FIG. 7 is a block diagram of a processor configured to allow parallel DMA operations during an interrupt service routine.

FIG. 7 is a block diagram of a processor 700 configured to allow parallel operations during an interrupt service routine. The processor 700 is similar to the processor shown in FIG. 6, with the addition of the parallel DMA capability. The processor 700 comprises a primary Program Counter (PC) 702, a branch PC 704, a branch PC 706, and a plurality of interrupt vectors. A first interrupt vector 708 and an Mth interrupt vector 710 are shown and act as interrupt-initiated program counters for the associated ISRS. The program counters 702, 704, 706, and the interrupt vectors 708, 710 are provided to a multi-input tag compare circuit 714. An output of the multi-input tag compare circuit 714 is provided to a banked cache 716. The tag compare circuit 714 and the banked cache 716 operate in a fashion similar to the tag compare 610 and banked cache described in connection with FIG. 6. As previously discussed, a banked cache with only one bank may also be used. Selected program counters 702, 704, 706 and the interrupt vectors 708 and 710 each may also be provided to inputs of a multithreading DMA multiplexer 712. An output of the multiplexer 712 is provided to a DMA prefetch control circuit 718. An output of the DMA prefetch control circuit 718 is provided to a DMA prefetch buffer 720. An output of the DMA prefetch buffer 720 is provided to a first input of an auxiliary multiplexer 722. An auxiliary VLIW output of the banked cache 716 is provided to a second input of the multiplexer 722. An output of the multiplexer 722 is provided to an auxiliary prefetch register 724. The banked cache 716 also provides a primary VLIW output to the processor pipeline (not shown).

The processor 700 combines the parallel branch processing shown in FIG. 4 with the parallel multithreading DMA processing shown in FIG. 5. During normal program execution, program addresses are provided by the primary PC 702. Addresses provided by the primary PC 702 are used to access the banked cache 716 to retrieve VLIW instruction words which are sent to the processor pipeline via the primary VLIW output. During execution of a conditional block, such as the ELSE path of an IF-THEN-ELSE construct, program addresses may be provided by one of the branch program counters, such as the branch PC 704. Addresses provided by the branch PC 704 may also be used to access the banked cache 716 to retrieve an execution thread of VLIW instruction words which are sent to the processor pipeline via the auxiliary prefetch register 724. Instructions in the auxiliary prefetch register may be processed in parallel with instructions from the primary VLIW path using cycle stealing. Alternatively, an execution thread may be accessed using the DMA prefetch controller which operates in the background to assemble auxiliary path VLIWs in the buffer 720 prior to being routed via the multiplexer 722 to the auxiliary VLIW input 724 to the dispatch unit (see FIG. 5). This allows a background task to execute in the cycle-steal mode without competing for VLIW cache space.

During execution of an interrupt service routine, addresses are provided by one of the interrupt vectors, such as the first interrupt vector 708. Addresses provided by the interrupt vector 708 may be used to access the banked cache 716 to retrieve VLIW instruction words to be sent to the processor pipeline in a prioritized foreground mode over a primary VLIW path 726, or may be sent to the processor in a lower priority background mode via the auxiliary. prefetch register 724. Alternatively, addresses provided by the interrupt vector 708 may be provided to the DMA prefetch control 718 which loads data from main memory into the DMA prefetch buffer 720. Data in the DMA prefetch buffer is provided through the multiplexer 722 to the auxiliary VLIW prefetch register 724. Providing data from the prefetch buffer 720 directly to the auxiliary prefetch register 724 bypasses the cache 716 and thus minimizes the effect of interrupt DMA processing on the cache.

Figure 8:
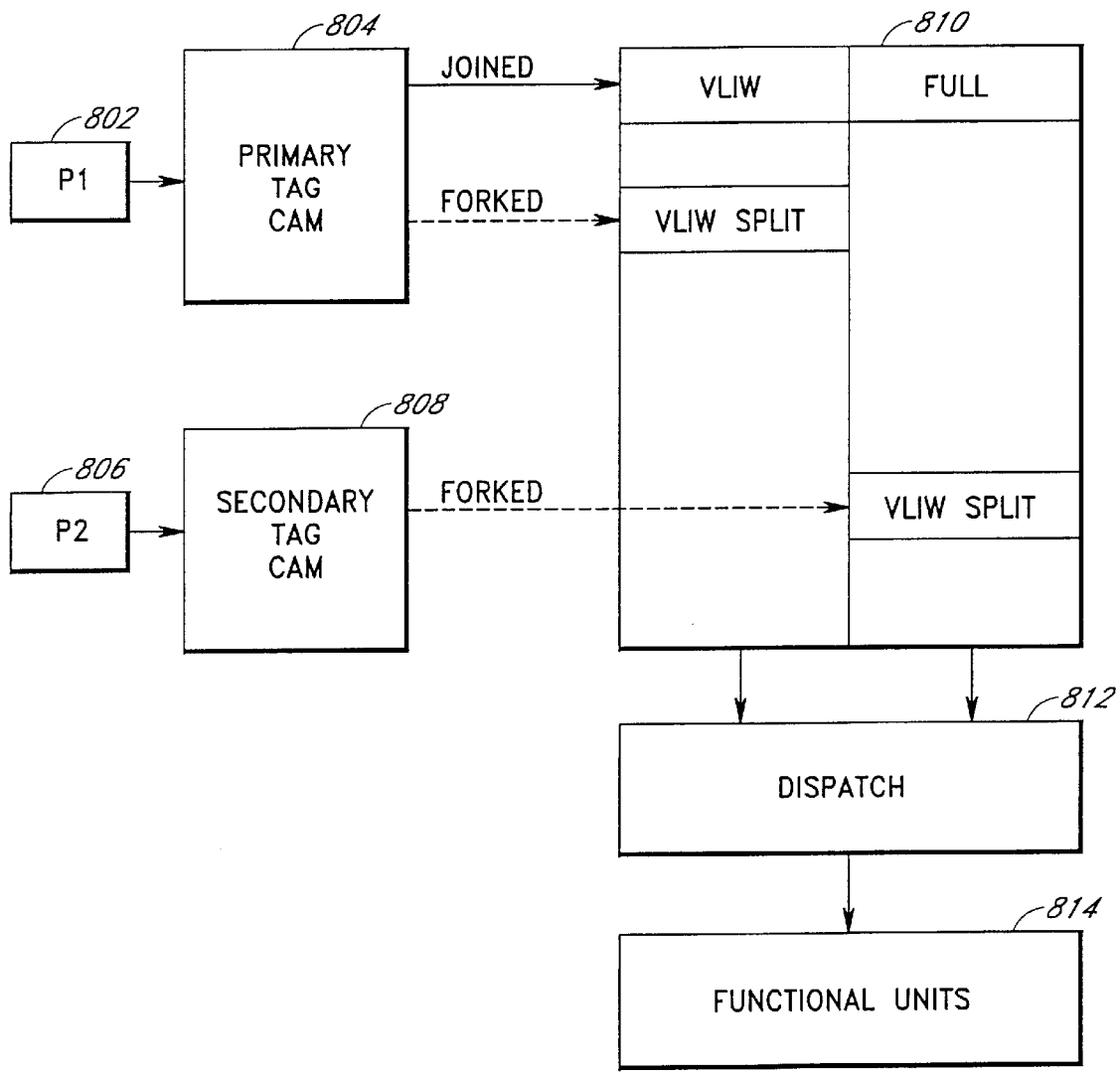
FIG. 8 illustrates how two program counters are used to access split VLIW instructions to provide two independent parallel processing paths in a VLIW processor.

FIG. 8 illustrates how two program counters are used to access split VLIW instructions to provide two independent parallel processing paths (e.g., the two paths of an IF-THEN-ELSE) in a VLIW processor employing two sub-processors. FIG. 8 also illustrates a primary program counter 802 and a secondary program counter 806. The primary program counter 802 is provided to a primary tag CAM 804. The CAM 804 provides a joined address to a cache 810 and also provides a forked address to the cache 810. The joined address is used to address full VLIW words from the cache 810. The forked address is used to address left-half VLIW words from the cache 810. The secondary program counter 806 is provided to a secondary tag CAM 808. The CAM 808 provides forked addresses to address right-half VLIW words from the cache 810. VLIW words from the cache are provided to a dispatch unit 812. The dispatch unit 812 provides outputs to drive a set of functional units 814.

When the system shown in FIG. 8 is used in normal (unforked) mode, joined addresses are provided to the cache 810 to retrieve full VLIW words from the cache 810. Full VLIW words are provided to the dispatch unit 812 for normal dispatch processing.

When execution of the processor is forked, two separate instruction streams are provided. The first instruction stream is addressed by the program counter 802 which addresses the left-half of the VLIW words in the cache 810. The second instruction stream is addressed by the program counter 806 and addresses the right-half of the VLIW words in the cache 810. A full VLIW word is assembled from the left-half and right-half words and the full VLIW word is provided to the dispatch unit 812. This illustrates how forked execution is achieved in conjunction with FIG. 4.

Although the present invention has been described with reference to a specific embodiment, other embodiments occur to those skilled in the art. For example, selection between more than two internal registers may be accomplished in each pipeline stage. Accordingly, the single bit line 340 shown in FIG. 3 may be replaced with multiple bit lines. Also, in other embodiments, a single set of internal pipeline registers may be shared among multiple threads, and the bit line 340 may be used only to select the external register set. In some embodiments, the line 340 may carry a thread indicator signal which is used to allow the functional units to access different resources, from the same or different register sets, while processing different threads. Also, in addition to the concept of having instruction streams with different priorities, other types of scheduling schemes, such as, for example, round robin, are also anticipated. It is to be understood therefore, that the invention herein encompasses all such embodiments that do not depart from the spirit and scope of the invention as defined in the appended claims.

What is claimed is:

1. A processing apparatus comprising:
   a first instruction fetch unit that fetches a first instruction stream along a first fetch path from a first memory unit to support the execution of a first program thread; and a direct memory access (DMA) controller that fetches a second instruction stream along a direct memory access fetch path from a second memory unit to support the execution of a second program thread.

2. The processing apparatus of claim 1, whereby said first and second memory units comprise different address ranges of the same physical memory.

3. The processing apparatus of claim 1, further comprising:
a first prefetch register, whereby instructions from said first instruction stream are temporarily buffered in said first prefetch register; and
an auxiliary prefetch register, whereby instructions from said a second instruction stream are temporarily buffered in said auxiliary prefetch register.

4. The processing apparatus of claim 1, further comprising:
a multiplexed dual input dispatch unit, whereby said multiplexed dual input dispatch unit comprises:
a first input that is capable of receiving one or more instructions from said first instruction stream;
a second input that is capable of receiving one or more instructions from said second instruction stream;
an output that is capable of selectively outputting one or more instructions received from said first and second inputs.

5. The processing apparatus of claim 4, further comprising:
a first prefetch register, whereby instructions from said first instruction stream are temporarily buffered in said first prefetch register; and
an auxiliary prefetch register, whereby instructions from said a second instruction stream are temporarily buffered in said auxiliary prefetch register;
whereby said first input comprises a coupling to receive at least one instruction from said first prefetch register and said second input comprises a coupling to receive at least one instruction from said auxiliary prefetch register.

6. The processing apparatus of claim 4, further comprising:
at least one decode unit, said at least one decode unit coupled to receive one or more instructions from said output.

7. The processing apparatus of claim 6, whereby said at least one decode unit comprises a plurality of instruction decoders operative to simultaneously decode a plurality of instructions to be subsequently executed by a plurality of functional units.

8. The processing apparatus of claim 6, whereby said processing apparatus is a multi-issue processor and further comprises a plurality of functional units.

9. The processing apparatus of claim 8, whereby at least one of said plurality of functional units is a multiple register set functional unit.

10. The processing apparatus of claim 9, whereby said multiple register set functional unit includes a plurality of internal register sets.

11. The processing apparatus of claim 9, whereby said multiple register set functional unit is coupled to a plurality of external register sets.

12. The processing apparatus of claim 1, whereby said processing apparatus is a multi-issue processor having a plurality of functional units responsive to processor instructions, said functional units having access to a primary register file, said processing apparatus further comprising:

one or more auxiliary register files configured such that each of said functional units has access to a primary register file and to an auxiliary register file;
a register file selection signal, said functional units being responsive to said register file selection signal; and
a dispatch unit configured to accept instructions from a plurality of instruction streams and to generate said register file selection signal on an instruction-by-instruction basis to control whether each of said functional units uses said primary register file or said auxiliary register file.

13. The processing apparatus of claim 12, further comprising:
a register renaming unit operative to rename registers and accept inputs from and to retire results to either said primary register file or said auxiliary register file to support superscaler instruction dispatching and execution from a plurality of program sources.

14. The processing apparatus of claim 1, wherein said second instruction stream is activated in response to an interrupt.

15. The processing apparatus of claim 1, wherein said first memory unit comprises a cache memory and said second memory unit comprises a bulk memory.

16. The processing apparatus of claim 1, wherein said second instruction stream is processed in a cycle-steal mode while said first instruction stream executes in a high-priority mode.

17. The processing apparatus of claim 1, wherein said first and second instruction streams comprise VLIW fetch packets, wherein each VLIW fetch packet comprises one or more execute packets, and wherein each execute packet comprises one or more instructions to be dispatched to one or more functional units in a single clock cycle.

18. A computer-implemented method comprising:
fetching a first instruction stream from a first memory unit to support the execution of a first program thread; and
fetching a second instruction stream using a direct memory access (DMA) controller from a second memory unit to support the execution of a second program thread.

19. The method of claim 18, whereby said second instruction stream is activated by an interrupt.

20. The method of claim 18, whereby said second instruction stream is read from a bulk memory and is processed in a cycle-steal mode while the first instruction stream is processed at full speed and at least some instructions from said first instruction stream are read from a cache memory.

21. The method of claim 18, wherein said first and second instruction streams comprise VLIW fetch packets, wherein each VLIW fetch packet comprises one or more execute packets, and wherein each execute packet comprises one or more instructions to be dispatched to one or more functional units in a single clock cycle.

22. The method of claim 18, wherein said first program thread corresponds to a task and said second program thread corresponds to an interrupt service routine.

23. A computerized system comprising:
a processing apparatus, said processing apparatus comprising:
a first instruction fetch unit that fetches a first instruction stream along a first fetch path from a first memory unit to support the execution of a first program thread; and
a direct memory access (DMA) controller that fetches a second instruction stream along a direct memory access fetch path from a second memory unit to support the execution of a second program thread.

24. A processing apparatus comprising:

first instruction fetch means for fetching a first instruction stream along a first fetch path from a first memory means to support the execution of a first program thread; and means for fetching a second instruction stream along a direct memory access fetch path from a second memory means to support the execution of a second program thread.

25. A computer-implemented method for processing data, comprising:

fetching a first instruction stream from a first memory unit for supporting the execution of a first program thread; and fetching a second instruction stream using a direct memory access (DMA) controller from a second memory unit for supporting the execution of a second program thread.

* * * * *